(12) United States Patent
Jezek

(10) Patent No.: US 6,231,323 B1
(45) Date of Patent: *May 15, 2001

(54) HIGH PRESSURE RECIPROCATING PUMP

(75) Inventor: Paul D. Jezek, Houston, TX (US)

(73) Assignee: Jetstream of Houston, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,261

(22) Filed: Jan. 15, 1999

(51) Int. Cl.[7] .............................. F04B 39/10; F16K 17/26; F16K 21/10
(52) U.S. Cl. ................... 417/567; 137/512.5; 137/493.8; 137/493.9
(58) Field of Search ................... 417/567; 137/512.5, 137/493.8, 493.9

(56) References Cited

U.S. PATENT DOCUMENTS

| | | | | |
|---|---|---|---|---|
| 3,702,624 | * | 11/1972 | Fries | 137/512 |
| 4,552,180 | * | 11/1985 | Mayer | 137/625.66 |
| 4,878,815 | * | 11/1989 | Stachowiak | 417/63 |
| 5,241,986 | * | 9/1993 | Yie | 137/512 |
| 5,662,188 | * | 9/1997 | Ito et al. | 184/6.3 |

* cited by examiner

Primary Examiner—Timothy S. Thorpe
Assistant Examiner—Timothy P. Solak
(74) Attorney, Agent, or Firm—Browning Bushman

(57) ABSTRACT

A high pressure reciprocating pump (10) for high fluid pressures between 30,000 and 60,000 psi and having a valve cartridge (57) positioned within a manifold block (15) of the pump (10). The valve cartridge (57) has a fixed body (58) with a plurality of equally spaced suction opening (69) extending therethrough. A central bore (70) of the valve cartridge body (58) has a valve assembly (72) mounted therein. Valve assembly (72) include a discharge valve member (74) and a suction valve member (80) mounted for sliding movement about the outer surface of discharge valve member (74). A spring (84) biased between discharge valve member (74) and suction valve member (80) continuously urges the valve members (74, 80) toward closed position. On the suction stroke, suction valve member (80) is opened and fluid through suction openings (69) enters the pump chamber (37). On the power stroke, high pressure fluid is discharged through the central bore (77) and lateral slots (79) of open discharge valve member (74) past seat (78).

16 Claims, 3 Drawing Sheets

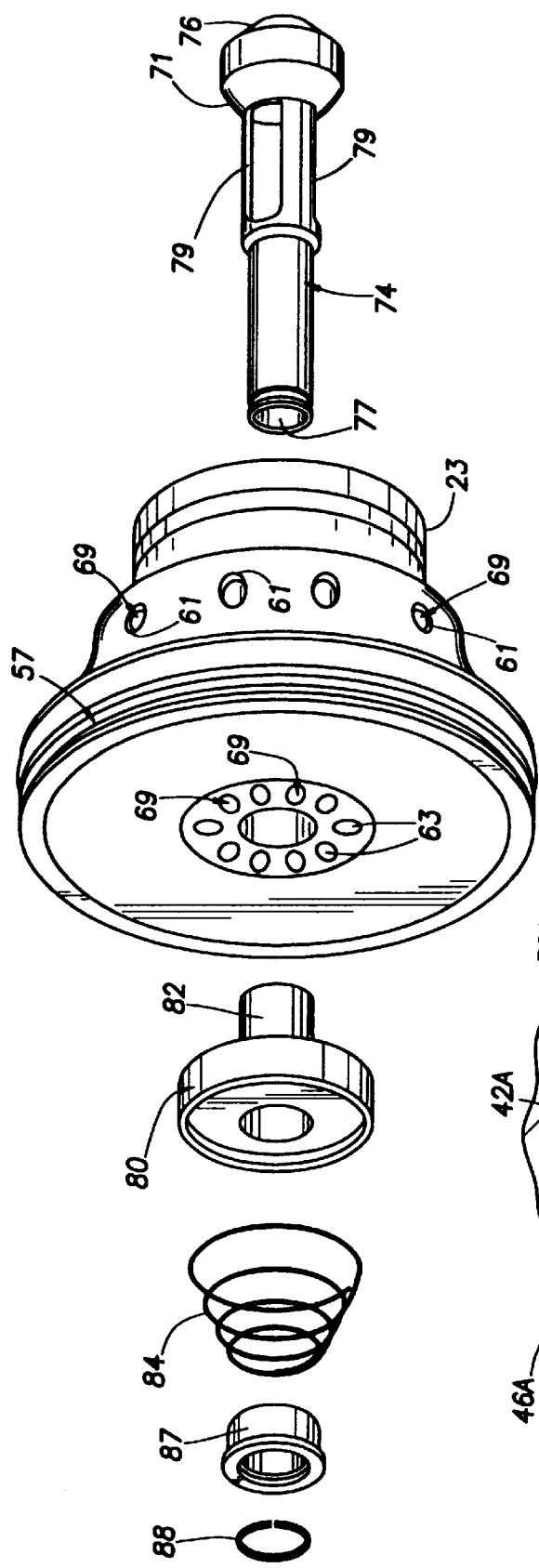

HIGH PRESSURE RECIPROCATING PUMP

FIELD OF THE INVENTION

This invention relates to high pressure reciprocating pumps of the type used in high pressure water jet applications, and more particularly to an improved valve cartridge for fitting between pump elements.

BACKGROUND OF THE INVENTION

U.S. Pat. No. 4,878,815 dated Nov. 7, 1989 shows a high pressure reciprocating pump utilizing high pressure water jet cleaning for producing fluid pressure up to 35,000 psi. When higher pressures are encountered, such as pressures in the range of 50,000 psi to 60,000 psi, stress concentrations at such high fluid pressure result in undue wear and cracks, particularly adjacent the entrances to discharge flow holes or openings through which the high pressure fluid is discharged on the power stroke. Stress concentrations are high at the corners of the openings and hard alloy materials for such areas are expensive and difficult to machine or round at the corners where the stress concentrations occur. Particularly where small diameter openings are provided for very high fluid pressures, the corners or entrances to such small diameter openings are difficult for machine or chamfer.

As shown in the '815 patent, the plunger in the suction stroke results in opening of the suction valve to permit fluid within the pump chamber. Then, during the following power stroke, the high fluid pressure is discharged from the pump chamber through a plurality of relatively small discharge holes or openings into a large discharge port. The corners of the entrances to the plurality of relatively small discharge openings are subjected to stress concentrations from the high fluid pressure during the power stroke which results in wear and some cracks at very high pressures encountered.

An object of the invention is to provide a high pressure reciprocating pump for high fluid pressures between 30,000 and 60,000 psi in which high stress concentrations are minimized.

Another object of the invention is to provide such a high pressure reciprocating pump in which a replaceable valve cartridge is utilized.

SUMMARY OF THE INVENTION

The present invention is directed particularly to an improved valve cartridge for fitting within the manifold block of a high pressure reciprocating pump as illustrated generally in U.S. Pat. No. 4,878,815. The valve cartridge fits between the manifold block and the adjacent mounting plate and can be easily removed and replaced upon disassembly of the mounting plate from the manifold block.

The valve cartridge of the present invention includes a fixed body of a generally frusto-conical shape with a plurality of equally spaced relatively small diameter suction openings extending through the body and providing fluid communication between an annular suction chamber and the pump chamber. A valve assembly is mounted within a central bore of the cartridge body including a generally cylindrical discharge valve member having a central bore and a plurality of lateral slots extending through the wall of the discharge valve member at the valve seat adjacent an end of the discharge valve member. In the power stroke from a piston or plunger, the pressurized water forced from the pump chamber acts against a closed end of the discharge valve member and opens the discharge valve member with pressurized water flowing through the lateral slots past the valve seat into a discharge port.

An annular suction valve member fits about the cylindrical discharge valve member over the suction openings in the cartridge body. The suction valve member is spring biased between the suction valve member and the discharge valve member to a normally closed position over the suction openings. In the suction stroke, the suction valve member moves to an open position relative to the suction openings to permit the pressurized water to be drawn within the pump chamber through the plurality of relatively small diameter suction openings. Thus, the small diameter suction openings are not exposed to very high fluid pressures such as 50,000 psi. The relatively large lateral openings in the discharge valve member are exposed to very high fluid pressures but relatively small stress concentrations occur and high alloy metals can easily be provided along the surfaces of the relatively large lateral openings in the discharge valve member to minimize wear.

Other features and advantages of the invention will become apparent from the following specifications and drawings.

BRIEF DESCRIPTION OF THE DRAWINGS

FIG. 4 is a perspective view of the valve cartridge showing the valve assembly exploded to illustrate the discharge valve member and the suction valve member; and FIG. 5 is an enlarged section of a modified packing assembly for the stuffing box and piston.

DESCRIPTION OF THE INVENTION

Figure 1:
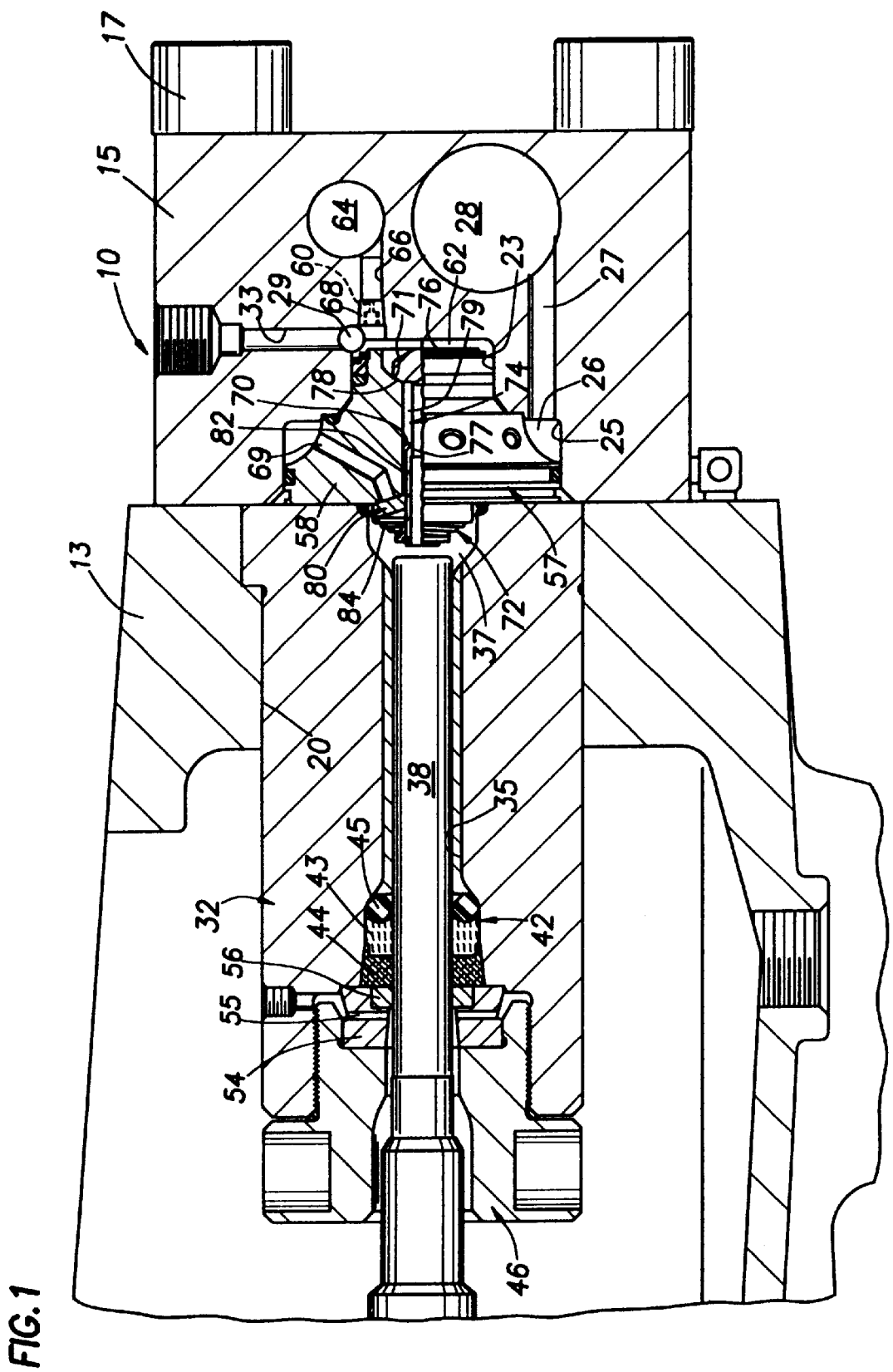
FIG. 1 is a longitudinal cross-sectional view through a fluid end of the high pressure reciprocating pump of the present invention showing the valve cartridge between the manifold block and adjacent mounting plate with the pump shown in a neutral position between pumping and suction strokes.

Referring to the drawings and in particular FIG. 1, a high pressure reciprocating pump is shown generally at 10 including a rectangular mounting plate or clamping plate 13 bolted to a rectangular manifold block 15 by bolts 17. A cylindrical bore 20 extends through mounting plate 13 and receives a stuffing box 32. A central longitudinal bore 35 extends through stuffing box 32 and forms a pump chamber 37 slidably receiving one end of a cylindrical plunger or piston 38. A plunger packing assembly 42 includes a packing ring 43, an adapter ring 44, and a retainer ring 45 about plunger 38. A packing gland 46 received within stuffing box 32 is effective for mounting of rings 43, 44, and 45. A guide bushing 54 has lubricating ports 55 and fits over a washer 56 preferably formed of tungsten carbide or a hard ceramic material. Rings 43 and 44 may be snapped together in a snap fit. Lubricant flows through ports 55 for cooling and lubricating plunger 38.

Manifold block 15 has a large diameter outer bore portion 25 and a small diameter inner bore portion 23. Mounted within bore portions 23, 25 is a valve cartridge assembly generally indicated at 57 having a body 58 received within bore portions 23 and 25. A suction port 28 has a suction passage 27 exiting therefrom to an annular suction chamber 26. A relatively small diameter discharge port 29 communicates with discharge chamber 62 defined by small diameter bore portion 23. Discharge port 29 is in fluid communication with fluid passage 33. In order to dampen the pulsations resulting from the pump strokes, a fluid accumulator shown at 64 is in fluid communication with discharge chamber 62 through fluid passage 66. Mounted in fluid passage 66 is an externally threaded removable orifice plug 68 having an orifice 60 therein of a predetermined size to provide the desired dampening of pulsations. Orifice plugs having different size orifices may be utilized to provide the desired dampening.

Fixed body 58 of valve cartridge 57 has a plurality of equally spaced relatively small diameter suction openings or holes 69 extending through body 58 and in fluid communication with annular suction chamber 25. Suction openings 69 have entrance ends 61 and exit ends 63. Valve cartridge 57 also includes a central bore 70 and a valve seat 78 adjacent an end of bore 70. Mounted within bore 70 is a valve assembly generally indicated at 72. Valve assembly 72 includes a generally cylindrical discharge valve 74 having a closed outer end 76 and an enlarged diameter tapered a seat surface 71 for sealing against seat 78 on body 58. Discharge valve member 74 has a central bore 77 and elongate lateral slots 79 adjacent tapered seat surface 71 extending laterally through the wall of discharge valve member 74 from bore 77. Annular seals 23A and 25A are provided between fixed body 58 and bore portions 23 and 25. An annular seal 27A is provided between body 58 and stuffing box 32.

Figure 2:
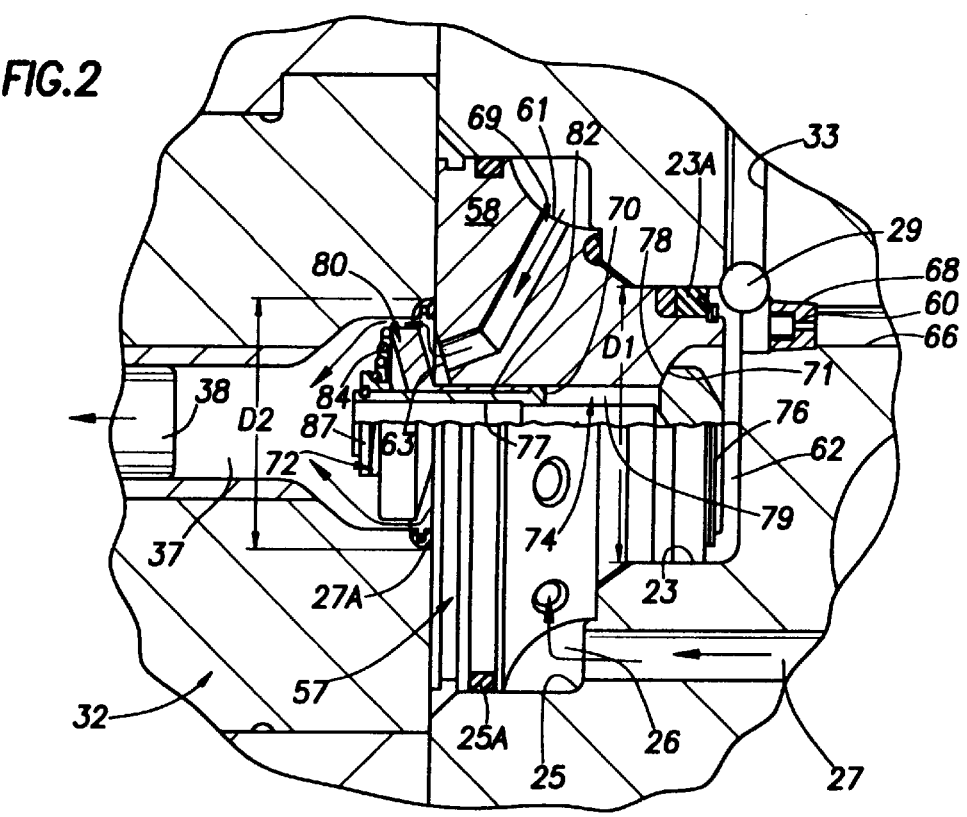
FIG. 2 is an enlarged fragmentary sectional view showing the pump in a suction stroke in which the suction valve member is in an open position and fluid is drawn into the pump chamber through a plurality of relatively small diameter suction openings in the cartridge body.
Figure 3:
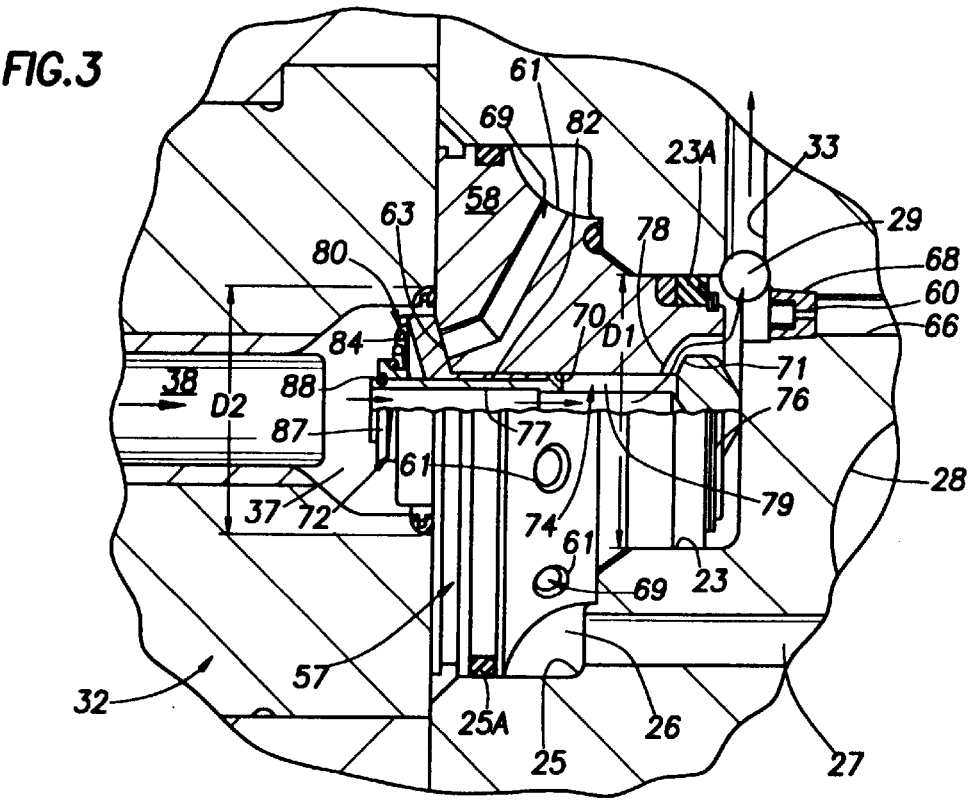
FIG. 3 is a sectional view similar to FIG. 2, but showing the power stroke of the pump with pressurized water being forced from the pump chamber through the bore of a central discharge valve member and through lateral openings in the discharge valve member past the valve seat into the discharge port.

An annular suction valve member 80 about cylindrical discharge valve member 74 has a sleeve 82 slidably mounted in a guiding relation along the outer surface of cylindrical discharge valve member 74 and extending laterally at one end over suction opening 19. A spring 84 of a frusto-conical shape is biased between discharge valve member 74 and suction valve member 80 for continuously urging suction valve member 80 in a closed position over exit ends 63 of suction openings 69. Frusto-conical springs 84 fits within a relatively small space and biases valve members 74 and 80 in opposed relation to continuously urge discharge valve member 74 to a closed seated position on seat 78. A spring retainer 87 is mounted about discharge valve member 74 and a c-shaped lock ring 88 removably secures spring retainer 87 on valve member 74. FIG. 2 shows valve members 74 and 80 in the position of the suction stroke of piston 38. FIG. 3 shows valve members 74 and 80 in the position of the power stroke of piston 38 with pressurized fluid being forced into discharge chamber 62 and discharge port 29. Piston 38 and valve members 74, 80 are shown in FIG. 1 in a neutral position at the end of the power stroke after discharge valve member 74 returns to a closed seated position on seat 78. Water is constantly supplied to annular suction chamber 26.

An area A1 is formed by discharge chamber 62 having a diameter D1 defined by the outer periphery of seal 23A. An area A2 is formed by the outer diameter D2 of seal 27A at pump chamber 37. To obtain optimum sealing during pumping and suction strokes, it is preferred that area A1 be about ten (10) percent greater than the area of A2. Satisfactory results may be obtained with area A1 being between about five (5) percent and twenty-five (25) percent greater than the area A2. Since area A1 is greater than area A2 fluid pressure in discharge chamber 62 is utilized to force body 58 into sealing contact with stuffing box 32.

A modified packing assembly 42A is shown in FIG. 5 in which an alignment bushing 54A is shown about piston 38A in engagement with backup ring 44A. Bushing 54A has a bore and an outer spherical surface 56A adjacent the bore. Packing gland 46A has a concave recess 57A defining a spherical surface and Alp receiving bushing 54A. Limited relative movement is permitted between bushing 54A and packing gland 46A. Packing ring 43A formed of a fibrous material is press fitted within backup ring 44A with a snap fit. Sleeve 39A about shaft 38A is in engagement with packing ring 43A. Packing gland 46A which receives bushing 54A also contacts the outer marginal edge portion 41A of backup ring 44A which is normally formed of a plastic material. Bushing 54A easily aligns and conforms to piston 38A and compensates for small misalignments of piston 38A. Lubricant openings 55A are provided in packing gland 46A.

For further details of pump 10, reference is made to the aforementioned U.S. Pat. No. 4,878,815 dated Nov. 7, 1989, the entire disclosure of which is incorporated by this reference.

Operation

During the suction stroke of plunger 38 as shown in FIG. 2 moving to the left from the position of FIG. 1, suction valve member 80 moves to an open position to open exit ends 63 of suction openings 69 against the bias of spring 84 and water from annular chamber 26 flows through suction openings 69 into pump chamber 37 adjacent the end of piston 38. Spring 84 retains the discharge valve member 74 in a closed seated position on seat 78.

During the power stroke of piston 38 as shown in FIG. 3 moving to the right from the end of the suction stroke, suction valve member 80 closes exit ends 63 of suction openings 69 under the bias of spring 84 and pressurized water is forced from pump chamber 37 by plunger 38 against valve member 74 to unseat and open discharge valve member 74. Upon opening of discharge valve member 74, pressurized fluid is forced through bore 77 and lateral slots 79 past seat 78 into discharge chamber 62 to discharge port 29 and accumulator 64.

The arrangement of the suction and discharge valves 80, 74 as set forth above, provides for the flow of relatively low pressure water on the suction stroke through a plurality of relatively small diameter suction openings 69 which are closed on the power stroke. During the power stroke, the high pressure water is forced through the relatively large central bore 77 of discharge valve member 74 and then out through relatively large lateral slots 79 to discharge port 29. The relatively large lateral slots 79 are provided with chamfered corners and can be easily alloyed with a hard alloy material. Such an arrangement tends to minimize stress concentrations and to permit the surfaces exposed to the high pressure water to be easily hardened with a suitable material.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A valve cartridge for positioning in an opening between a manifold block and a mounting plate of a high pressure reciprocating pump with a reciprocating piston adjacent said valve cartridge for operation of said pump in a suction stroke and a power stroke; said valve cartridge comprising:

a body having a cylindrical bore defining an inner peripheral surface and an annular valve seat adjacent an end of said bore;

a discharge valve member having a cylindrical body mounted within said bore against said inner peripheral surface with one end of said valve member adjacent said piston and an opposed end of said valve member being closed and having an enlarged diameter to define a seating surface for engaging said valve seat; said discharge valve member having a circumferential wall defining a central bore, said circumferential wall having a plurality of openings adjacent closed end;

resilient means continuously urging said discharge valve member into sealing relation with said valve seat;

a pump chamber defined between said piston and said discharge valve member; and a suction valve member having a cylindrical sleeve slidably mounted about said discharge valve member for guiding said suction valve member and permitting fluid to enter said pump chamber during the suction stroke of said piston; said piston in the power stroke forcing fluid through said discharge valve member for unseating of said discharge valve member and discharge of pressurized fluid through said openings past said seat into a discharge chamber;

the effective area of the discharge chamber being greater than the effective area of the pump chamber for urging hydraulically said body against said mounting plate.

2. A valve cartridge as set forth in claim 1 wherein said resilient means comprises of a frusto-conical shape spring having opposed ends compressed between said suction valve member and said discharge valve member for continuously biasing said suction valve member and said discharge valve member toward closed position.

3. A valve cartridge as set forth in claim 1 wherein a plurality of suction openings are spaced about the outer periphery of said valve cartridge body and extend through said body for providing fluid communication between a suction chamber adjacent said valve cartridge and said pumping chamber; said suction valve member being positioned in closed position over the suction openings adjacent the pump chamber.

4. A valve cartridge as set forth in claim 1 wherein said resilient means comprises a compression spring of a frusto-conical shape having opposed ends compressed between said suction valve member and said discharge valve member for continuously urging said suction valve member and said discharge valve member toward a closed position.

5. A valve cartridge as defined in claim 1, further comprising:

a plurality of suction openings are spaced about the outer periphery of said valve cartridge body, said cylindrical sleeve of said suction valve member extending outwardly at one end of said sleeve over said suction openings.

6. A valve cartridge as defined in claim 1, wherein said cylindrical sleeve is in sliding contact relation with said inner peripheral surface of said bore and said cylindrical body for being guided therebetween.

7. A valve cartridge as defined in claim 6, wherein said suction valve member comprises a cylindrical sleeve positioned about said cylindrical discharge valve member and mounted for relative sliding movement thereon.

8. A valve cartridge as set forth in claim 6, wherein a frustoconical compression spring is biased between said suction valve member and said discharge valve member and continuously urges said suction valve member toward a closed position.

9. A high pressure reciprocating fluid pump comprising:

a manifold block;

a stuffing box mounted against said manifold block;

a reciprocating piston mounted within said stuffing box;

a pumping chamber adjacent an end of said piston;

a discharge chamber in said manifold block;

valve means between said pumping chamber and said discharge chamber including a suction valve member to permit fluid to enter said pumping chamber on a suction stroke and a discharge valve to permit fluid to enter said discharge chamber on a pumping stroke;

a fluid accumulator in said manifold block;

a relatively small orifice between said discharge chamber and said accumulator to permit limited fluid flow between said discharge chamber and said accumulator for dampening pulsation of said pump; and a removable orifice plug having said small orifice therein and fitting within a flow passage between said discharge chamber and said accumulator, said orifice plug being removable and replaceable with another orifice plug having an orifice therein of a predetermined size.

10. A valve cartridge for positioning in an opening between a manifold block and a mounting plate of a high pressure reciprocating pump with a reciprocating piston adjacent said valve cartridge for operation of said pump in a suction stroke and a power stroke; said valve cartridge comprising:

a body having a central bore therethrough and a fixed valve seat adjacent a downstream end of said bore;

a generally cylindrical discharge valve member mounted within said central bore, said discharge valve member having a circumferential wall defining a central bore with a closed downstream end defining a seating surface for seating on said fixed valve seat during the suction stroke and movable to an unseated position during a power stroke of said piston, said circumferential wall having a plurality of elongate slots adjacent said closed downstream end and said seating surface for fluid flow from said bore of said discharge valve member through said elongate slots to a discharge chamber upon unseating of said discharge valve member during the power stroke;

said valve cartridge body having a plurality of spaced suction openings extending about the outer periphery of said body, said suction openings extending between a suction chamber adjacent the outer periphery of said body and a pump chamber adjacent an end of said body adjacent said piston; and a suction valve member closing said suction openings during the power stroke of said piston and opening said suction openings during the suction stroke of said piston to permit fluid flow between the suction chamber and pump chamber.

11. A valve cartridge as defined in claim 10, wherein said closed end has an enlarged diameter extending radially beyond said circumferential wall to define said seating surface for seating against said fixed seat.

12. In a high pressure reciprocating fluid pump having a manifold block, a stuffing box fitting against said manifold block, a clamping plate removably secured to said manifold block and mounting said stuffing box onto said manifold block, and a reciprocating piston mounted within said stuffing box; a valve cartridge positioned in an opening between said manifold block and said stuffing box, said valve cartridge comprising:

a body having a central bore therethrough and a fixed valve seat adjacent an end of said central bore;

a generally cylindrical discharge valve mounted within said bore, said discharge valve member having a circumferential wall defining an axial bore with a closed downstream end having an enlarged diameter defining a seating surface for seating on said fixed valve seat during a suction stroke and moveable to an unseated position during a power stroke of piston;

resilient means continuously urging said discharge valve member into sealing relation with said valve seat;

a pump chamber defined between said piston and said discharge valve member; and a suction valve member permitting fluid to enter said pump chamber during a suction stroke of said piston;

said piston on a discharge stroke forcing fluid through said axial bore of said discharge valve member for unseating of said discharge valve member and discharge of fluid through said axial bore past said seat into a discharge chamber.

13. In a high pressure reciprocating fluid pump as defined in claim 12, wherein said suction valve member comprises a cylindrical sleeve mounted about said cylindrical discharge valve member for relative sliding and guiding movement.

14. In a high pressure reciprocating fluid pump as defined in claim 12, wherein said resilient means comprises a spring having opposed ends seated on said suction valve member and said discharge valve member for continuously biasing said suction valve member and said discharge valve member toward a closed position.

15. In a high pressure reciprocating fluid pump as defined in claim 12, further comprising:

a suction port in said manifold block, and a suction passage extending from said suction port to an annular suction chamber.

16. In a high pressure reciprocating fluid pump as defined in claim 12, further comprising:

sealing means between said discharge chamber and said body.

* * * * *